United States Patent
Rutschke et al.

[11] Patent Number: 6,148,098
[45] Date of Patent: Nov. 14, 2000

[54] METHOD AND APPARATUS FOR ELECTRO-OPTICALLY DETERMINING THE CONTACT PATTERN ON TOOTH FLANKS OF GEARS

[75] Inventors: Arno Rutschke, Zurich; Volker Bartelt, Gippingen; Christian Pahud, Zurich, all of Switzerland

[73] Assignee: Oerlikon Geartec AG, Zurich, Switzerland

[21] Appl. No.: 09/150,217

[22] Filed: Sep. 9, 1998

[30] Foreign Application Priority Data

Sep. 8, 1998 [DE] Germany ............... 198 40 969

[51] Int. Cl.⁷ .................................. G06K 9/00
[52] U.S. Cl. ............. 382/141; 382/100; 382/149; 382/152; 382/199; 73/162; 364/551.01
[58] Field of Search .................. 382/100, 141, 382/152, 199, 149; 73/162; 364/551.01

[56] References Cited

U.S. PATENT DOCUMENTS

| | | | |
|---|---|---|---|
| 5,287,293 | 2/1994 | Chen et al. | 364/506 |
| 5,373,735 | 12/1994 | Gutman | 356/23 |
| 5,610,994 | 3/1997 | Stadtfeld et al. | 382/100 |

FOREIGN PATENT DOCUMENTS 88 879   2/1983   European Pat. Off. .

3-100434   4/1991   Japan .

*Primary Examiner*—Matthew C. Bella
*Assistant Examiner*—Sheela Chawan
*Attorney, Agent, or Firm*—McCormick, Paulding & Huber LLP

[57] ABSTRACT

A method and an apparatus are described for optoelectronically determining the contact patterns on tooth flanks of gears. The tooth flanks of at least one gear (24) of a pair of gears (22, 24) to be tested are marked by application of a marking compound. Contact patterns (28) are formed on the points of contact of the tooth flanks during operation. These contact patterns are picked-up and stored as a first digital image. The first digital image serves to determine a second digital image containing the outline of the tooth flank. A third digital image which contains the contact pattern (28) is determined from the first digital image. The second and the third digital images are superimposed on each other to determine a fourth digital image of the tooth flank, which contains the outline thereof and has its contact pattern inscribed therein, and which can be analyzed to determine the position and size of the contact pattern with reference to the outline. It is advantageous that the contact pattern can be determined and analyzed without a desired representation of the contact pattern or any reference image at all having to be available beforehand. It is a universal method in which the actual outline of the tooth flanks of the marked gear of the pair of gears to be tested is used for the analysis.

25 Claims, 6 Drawing Sheets

METHOD AND APPARATUS FOR ELECTRO-OPTICALLY DETERMINING THE CONTACT PATTERN ON TOOTH FLANKS OF GEARS

DESCRIPTION

This invention refers to a method and an apparatus of the type given in the preamble of claims 1 and 16, respectively.

A method and an apparatus of this type are known from the U.S. Pat. No. 5,373,735. The running and noise behavior, or more generally, the quality of mating gears is decisively influenced by the size, the shape, and the orientation of the contact pattern, i.e. by the area in which the drive-side or coast-side tooth flanks of a pair of gears contact one another. In a bevel gear pair comprising a ring gear and a pinion, the teeth of which are curved in the lengthwise and profile directions, it is especially important for the position and the size of the contact pattern to be optimally realized for every instance of use. Therefore, the prior art includes various methods of determining the contact pattern on tooth flanks of a pair of gears. Adjustments for the manufacturing process or for the mounting position of the tested pairs of gears can then be made on the basis of the contact pattern determined.

The above-mentioned U.S. Pat. No. 5,373,735 describes a method and an apparatus for determining the contact pattern in which a spray system is used to coat a portion of the gear with a marking compound such that the contact pattern, like a footprint, is formed while the pair of gears is running. Stroboscopic illumination of the gear makes the contact pattern visible during operation. An image processing system permits the analysis of the contact patterns detected. Here, a gear member of the gear pair, mounted on a carriage movable in two axes, is adjusted while the gear is still running to improve the meshing quality of the teeth. No quantitative analysis of the individual contact patterns is provided per se with regard to size and position, nor is this possible. The analysis is merely made in comparison with a reference image taken earlier.

The situation is similar in a method for determining the quality of the contact pattern of a gear, that is known from Patent Abstracts of Japan, vol. 15, no. 287, 140 P 1229 of Jul. 22, 1991. In this method paint is applied to the tooth flanks of a pair of gears. The contact patterns are recorded with a camera and evaluated to determine the extent to which the contact pattern on the tooth flank shifts during operation.

A method of digital imaging of a contact pattern is known from the U.S. Pat. No. 5,610,994. The possibilities for analysis are superior to those of the two previously mentioned cases, since the recorded contact image is inscribed into a matrix grid. For this purpose, however, to make an analysis possible sufficient data on the pair of gears in question has to be available for theoretically correct tooth surfaces to be calculated, displayed on a monitor, covered by the matrix grid and superimposed by the detected contact patterns. The analysis comprises determining by superimposition a consolidated contact image from all identified contact patterns that is representative of all tooth flanks of the respective gear. This known method is not applicable if no data on the gear are available from which a theoretically correct tooth flank surface can be determined.

The object of the invention is to create a method and an apparatus with which contact patterns on the tooth flanks of gears can be optoelectronically determined simply and individually for each tooth surface, without the necessity of having or producing a prior reference image.

This object is achieved according to the invention by a method including the steps given in claim 1, and by an apparatus containing the features given in claim 16.

In the method and the apparatus according to the invention, at least an adequate portion of the outline of every tooth flank of the gear to be tested is detected from the picked-up image showing at least one tooth flank with its contact pattern, to create a reference system on the basis of which the size and position of the contact pattern on the tooth flank can be determined later on. Furthermore, the contact pattern of the tooth flank is extracted and then inscribed into the determined portion of the outline. The resulting image can be measured to determine the location and size of the contact pattern with reference to the outline. For the method and the apparatus according to the invention, no desired representation of the contact pattern and no theoretically correct flank image, not even a reference image, has to be available beforehand for the contact pattern to be determined by location and size. The method according to the invention is a universal method in which the actual outline of the tooth flanks of the marked gear of the pair of gears to be tested is used for the analysis.

The apparatus according to the invention includes the features given in claim 16 to permit determination of the location and the size of the actual contact pattern with reference to the outline of the tooth flank.

Advantageous embodiments of the method according to the invention constitute the subject matters of claims 2 to 15.

Significant advantages result from an embodiment of the method according to the invention in which in a step (a) the tooth flanks of the marked gear are picked-up with at least one line-scan camera and stored line by line in an image matrix as a first digital gray level image containing a plurality of pixels, each having a gray value. Through the use of the line-scan camera the individual pixels are recorded in locally fixed positions. This results in the same lighting conditions for pixels of the same line position. The illumination of the teeth therefore has only a minor effect on the evaluation. A further embodiment of the method according to the invention, in which gray values between 0 and 255 are assigned to the pixels, is known from the U.S. Pat. No. 5,287,293 already mentioned above, albeit only in connection with the inspection of the contours of a gear and not in connection with the determination of the location and the size of contact patterns on tooth flanks of a gear.

In a further embodiment of the method according to the invention the first digital gray level image can be high-pass filtered to more heavily emphasize the outlines of the tooth flanks. A two-dimensional recursive filter implemented by a software routine is used for this.

In a further embodiment of the method according to the invention a first or second binary value is assigned to every pixel by comparison of its gray value with a first thresh-old value. Through the limitation to two gray values this results in an acceleration and simplification of the further processing of the digital gray level image.

Selecting a value above 200 as the first threshold value is a method-dependent definition that is advantageous in a special embodiment of the method according to the invention. The first threshold value in this is determined automatically on the basis of a histogram.

In a further embodiment of the method according to the invention a portion of the outline can be sufficient for determination of the location and the size of the contact pattern of each tooth flank. Of course, the evaluation is easiest whenever a complete outline is detected.

In a further embodiment of the method according to the invention the first digital gray level image is extracted by evaluating a histogram thereof with a second threshold value, so that a third digital image in the region of the tooth flank contains the contact patterns as solid surfaces. This represents a possibility for very rapidly analyzing the first gray level image.

In another embodiment of the method according to the invention the second digital image and the third digital image are superimposed on one another, making it possible to easily determine the location and size of the contact pattern in relation to the outline as a reference system.

In a further embodiment of the method according to the invention, which results in special advantages for the evaluation, each pixel of a fourth digital image is converted by a mathematical transformation, taking the shape and curvature of each tooth flank into account, to an equalized representation that corresponds to a depiction of the tooth flank developed in a plane. First of all, the result of this is a representation which the user is familiar with from his working environment and which he can therefore interpret and classify well by visual observation. Secondly, the information on location and size obtained in the analysis can be directly given to scale, for instance in millimeters.

In a further embodiment of the method according to the invention the digital images are each generated by superimposing and averaging the pictures of several tooth flanks. In this way an overall view of the quality of the pair of gears can be obtained by one measuring procedure.

Advantageous embodiments of the apparatus according to the invention constitute the subject matters of claims 17 to 25.

Embodiments of the invention are described in detail below with reference to the drawings, wherein.

Figure 1:
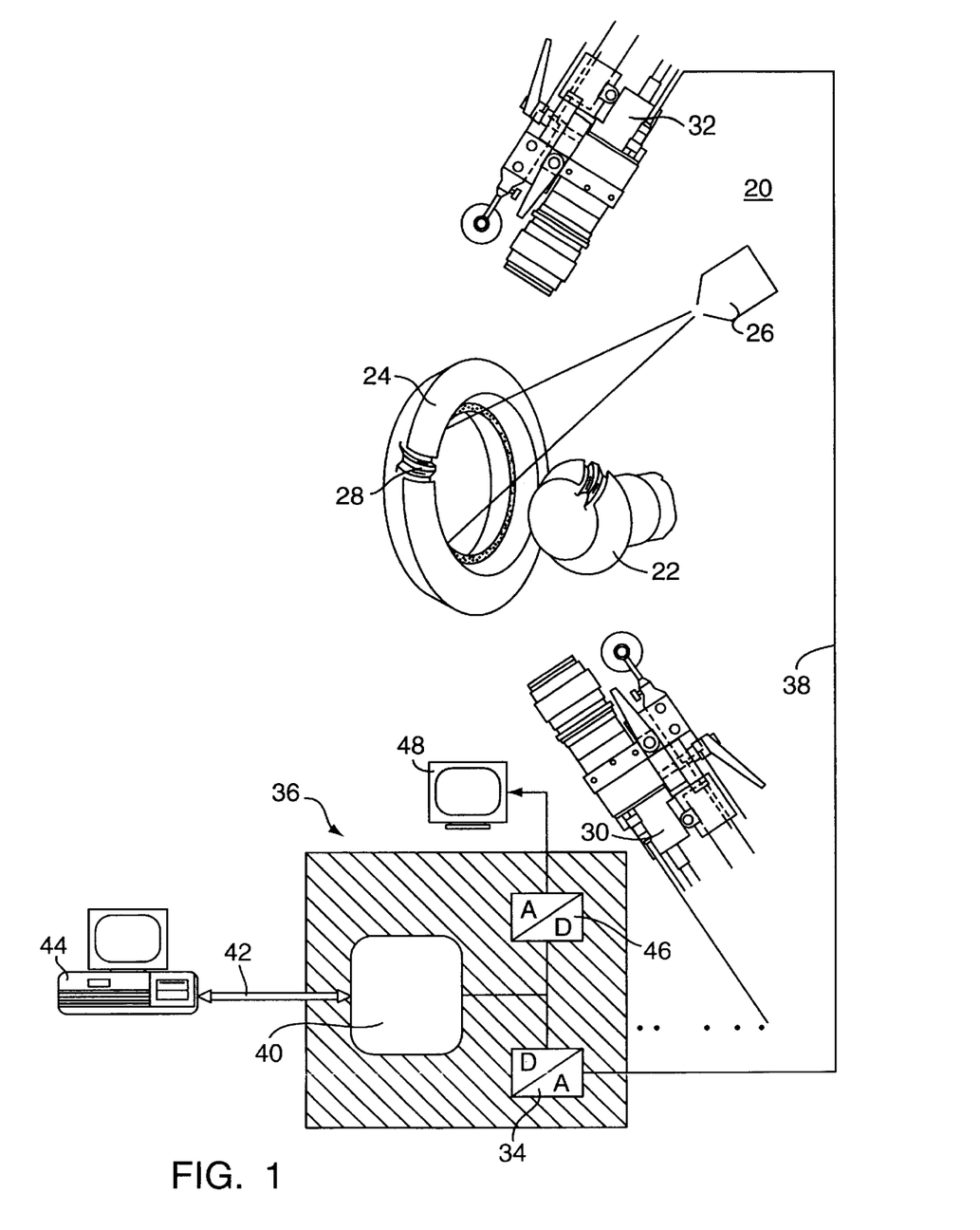
FIG. 1 shows an embodiment of an apparatus with two cameras for optoelectronically determining the contact patterns on tooth flanks of gears.

An embodiment of an apparatus for optoelectronically determining the contact patterns on tooth flanks of gears is generally numbered 20 in FIG. 1. A pair of bevel gears comprising a pinion 22 and a ring gear 24 is depicted as the gears to be tested. A paint spray system 26 serves to apply a marking compound to the tooth flanks of at least one gear of the pair of bevel gears to be tested, to make contact patterns 28 visible that come into being during operation. Two line-scan cameras 30 and 32 respectively are directed to the place at which the contact patterns on the tooth flanks of the ring gear 24 are visible. One line-scan camera serves to pick-up the drive side tooth flanks, and the other to pick-up the coast side tooth flanks of the marked ring gear 24. In the embodiment described here the line-scan camera 32 serves to pick-up gray level images. Its output is connected to an analog to digital or A/D converter 34 which is part of an image processing system generally numbered 36. The connection between the camera 32 and the A/D converter is comprised of a line 38 in the form of a signal cable, preferably a coaxial cable. The analog signals of the camera 32 that have been converted to digital signals by the A/D converter 34 are read into an image memory 40. The image memory 40 is connected via a bus 42 to a computer 44. A digital to analog or D/A converter 46 connected to the output of the A/D converter 34 is connected at its output to a monitor 48 for displaying the image picked-up by the camera.

Figure 11:
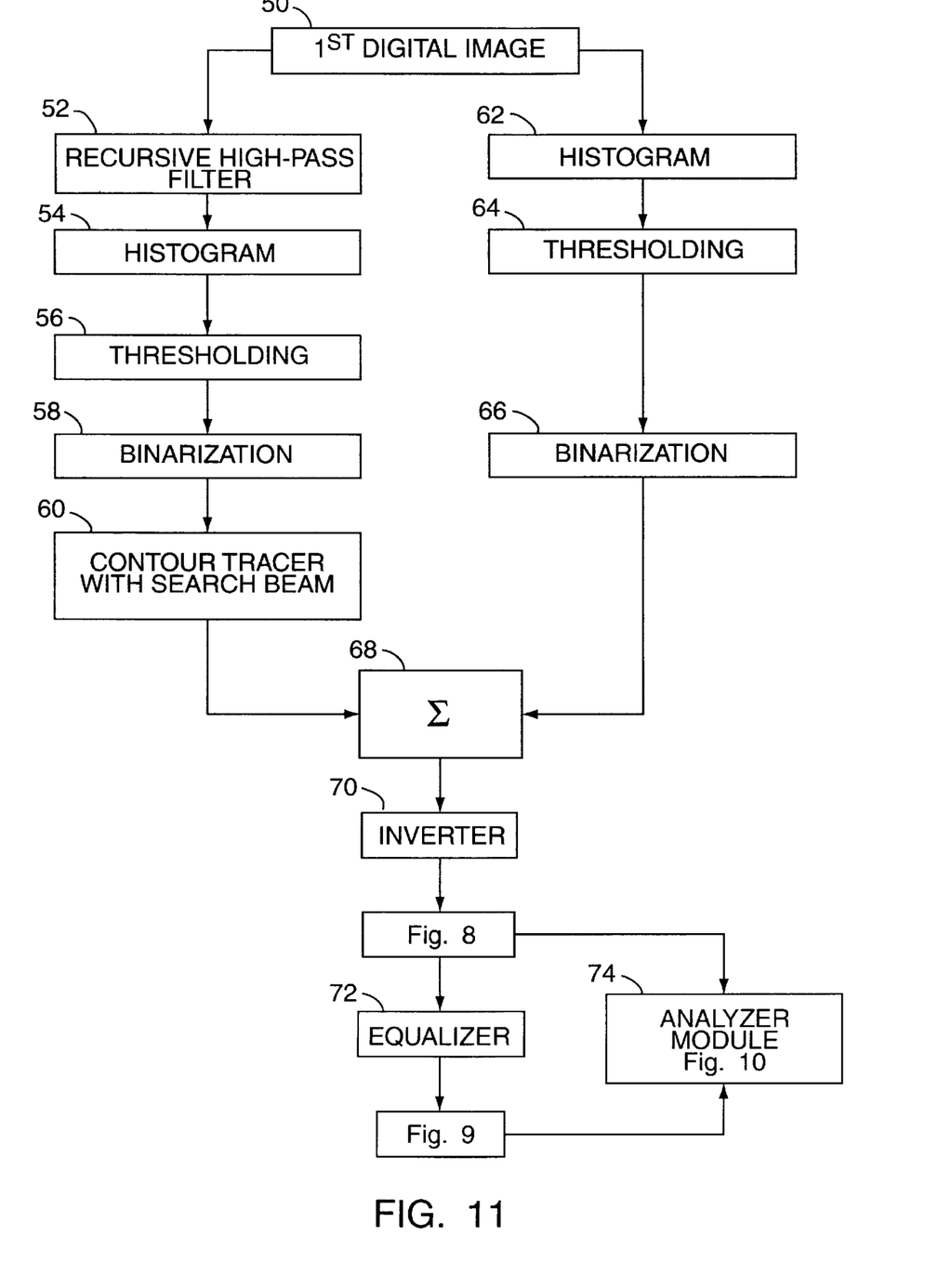
FIG. 11 shows a flow chart for explaining the method and apparatus according to the invention.

Means contained in the computer 44 for further processing a first digital image 50 supplied to the computer via the bus 42 from the image memory 40 will now be explained in detail on the basis of FIG. 11.

Figure 3:
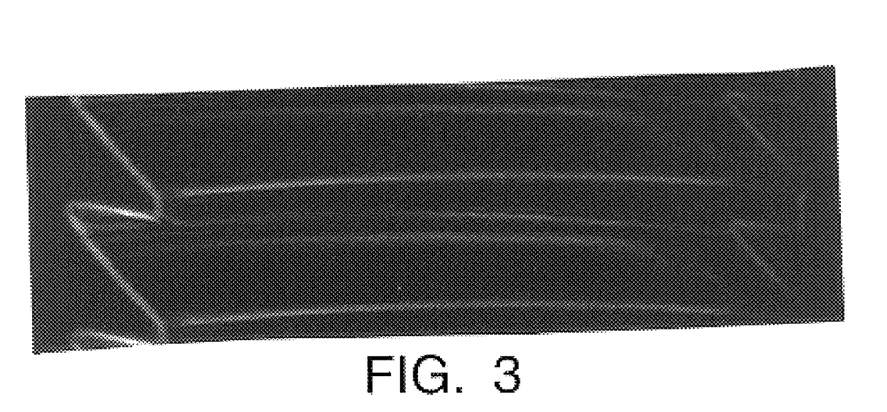
FIG. 3 shows a high-pass filtered version of the digital gray level image according to FIG. 1, in which gray value jumps such as those at the outlines of the tooth flanks are more heavily emphasized.
Figure 4:
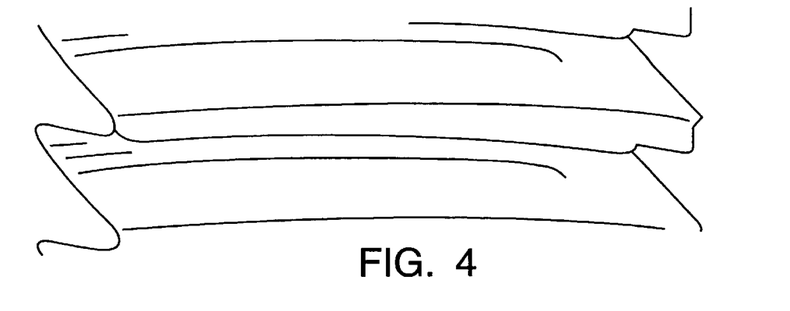
FIG. 4 shows the gray level image according to FIG. 3 after processing with a threshold value and binarization of the individual pixels.
Figure 5:
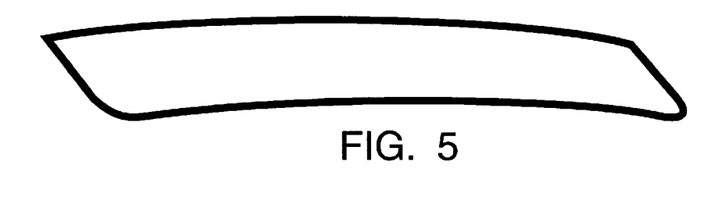
FIG. 5 shows the image of a tooth flank according to FIG. 4 after the flank outline has been closed by image processing.
Figure 8:
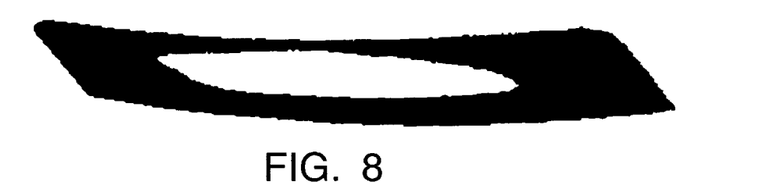
FIG. 8 shows an image of the tooth flank with a closed outline according to FIG. 5 and with a contact pattern according to FIG. 7 inscribed therein, after in version of the image matrix.
Figure 9:
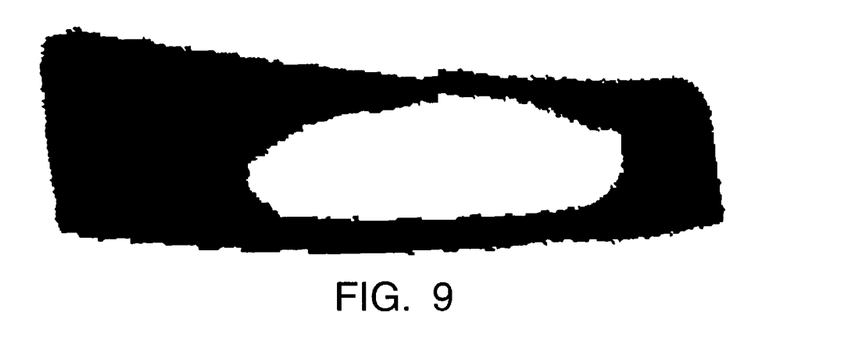
FIG. 9 shows an equalized form of the representation according to FIG. 8, FIGS. 10a–10d show different steps of an embodiment of the evaluation of the image representation according to FIGS. 8 or 9.

A recursive high-pass filter 52 constitutes first means for processing the image matrix to generate a second digital image as shown in FIG. 3, in which the outline of each tooth flank is more heavily emphasized. The digital image supplied by the high-pass filter 52 is further processed in a histogram 54 which represents second means for processing the first digital image. The histogram representation 54 serves to determine a first threshold value 56 for all pixels and to subsequently binarize 58 the same. The binary image is subsequently processed with a search beam by a contour tracer 60 at block 58 to search for discontinuous outline regions and to interconnect them as shown in FIGS. 4 and 5. Further means 62 for forming another histogram representation 62 determine a second threshold value 64 to generate a digital image according to FIG. 7, which is subsequently represented as a binary image in a block 66. Means 68 are provided for superimposing (summing) the digital images supplied by the blocks 60 and 66, to determine for each tooth flank an analyzable digital image (FIG. 8) containing the outline, with the respective contact pattern inscribed therein. Subsequent to the superimposition (summation) an inversion of the image obtained by the superimposition from the images according to FIGS. 5 and 7 takes place in an inverter 70. The image can then be converted in an equalizer 72 to an equalized representation according to FIG. 9. Finally, the contact pattern determined according to FIG. 8 or FIG. 9 is evaluated in an analyzer 74.

The image processing is described in detail below with reference to the representation shown in the individual FIGS. 1–11.

Figure 2:
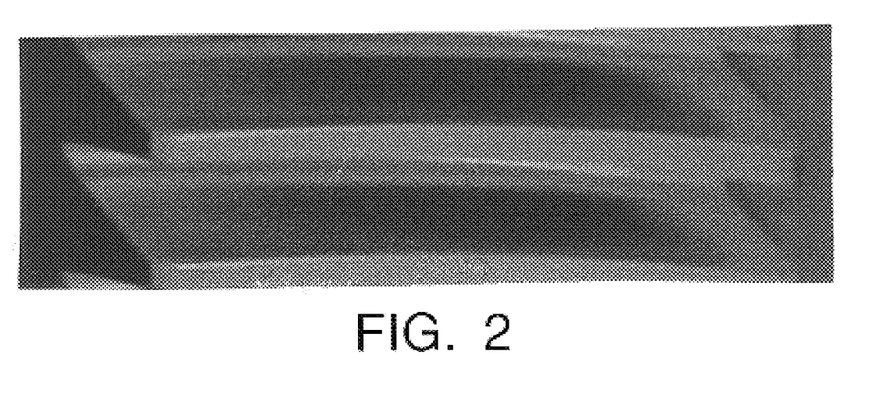
FIG. 2 shows an image in the form of a first digital gray level image, of the drive or coast side tooth flanks, taken by one of the cameras in FIG. 1 and showing the contact patterns of the teeth of a ring gear of a pair of bevel gears to be tested, that have teeth curved in the lengthwise and profile directions.

1. Picking-up the Image (FIGS. 1 and 2)

Digitization of the signals of the camera 32: Here, for example, 1024 pixels per line are stored line by line in an image matrix in the image memory 40. To each pixel is assigned a gray value between 0 (black) and 255 (white). This corresponds to an 8-bit digitization of the camera signal.

On completion of picking-up the image, the resulting first digital gray level image 50 is available for further processing in the image memory 40. The image includes the coast or drive side tooth flanks with the corresponding contact patterns of all teeth of the ring gear 24 of the pair of bevel gears to be tested.

2. Pre-processing the Image 2.1 High-pass Filtering (FIG. 3)

The 2-D high-pass filter 52 is applied to the first digital gray level image 50. The purpose of this high-pass filtering of the gray level image is to more heavily emphasize the flank boundaries, which are represented in the gray level image by jumps in the gray scale, as shown in FIG. 3. The contour regions are given higher gray values in the filtered image matrix, and thus they stand out as lighter image regions from the rest of the image.

2.2 Forming the Threshold Value and Binary Representation (FIG. 4) After a high threshold value (greater than 200) has been automatically determined, the gray value 255 is assigned to all pixels having a gray value below the threshold. The gray value 0 is assigned to all pixels having a gray value above the threshold value.

2.3 Contour Tracing and Generating (FIG. 5)

Now, the discontinuous regions of the outline are searched for and interconnected to form a closed contour by means of the contour tracer 60 with search beam. Pixels of lines that can not be extended to form closed contours are set at the gray value 255.

Instead of the closed outline two complete adjacent sides (e.g. two adjacent facing sides or two sides adjacent at a corner of the outline) or even merely four points of the outline can also be used for the further evaluation. However, a closed outline, as shown in FIG. 5, facilitates the analysis.

On completion of these preprocessing steps, the closed outlines of all tooth flanks are available as an image matrix in the image memory 40. This image matrix is referred to here as the second digital image.

Figure 6:
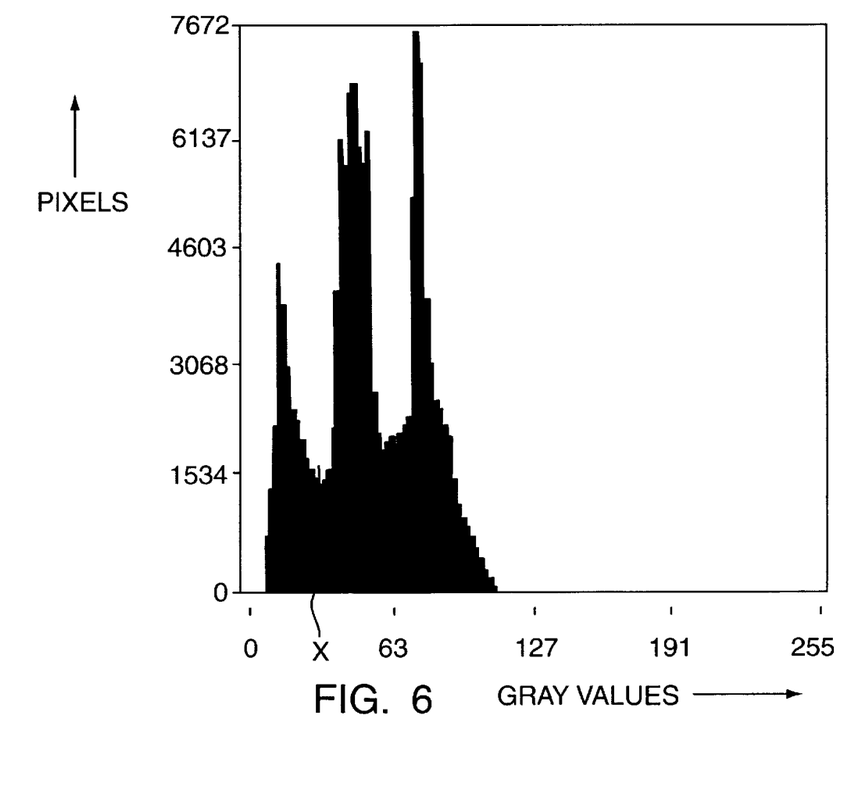
FIG. 6 shows a histogram of the image according to FIG. 2.
Figure 7:
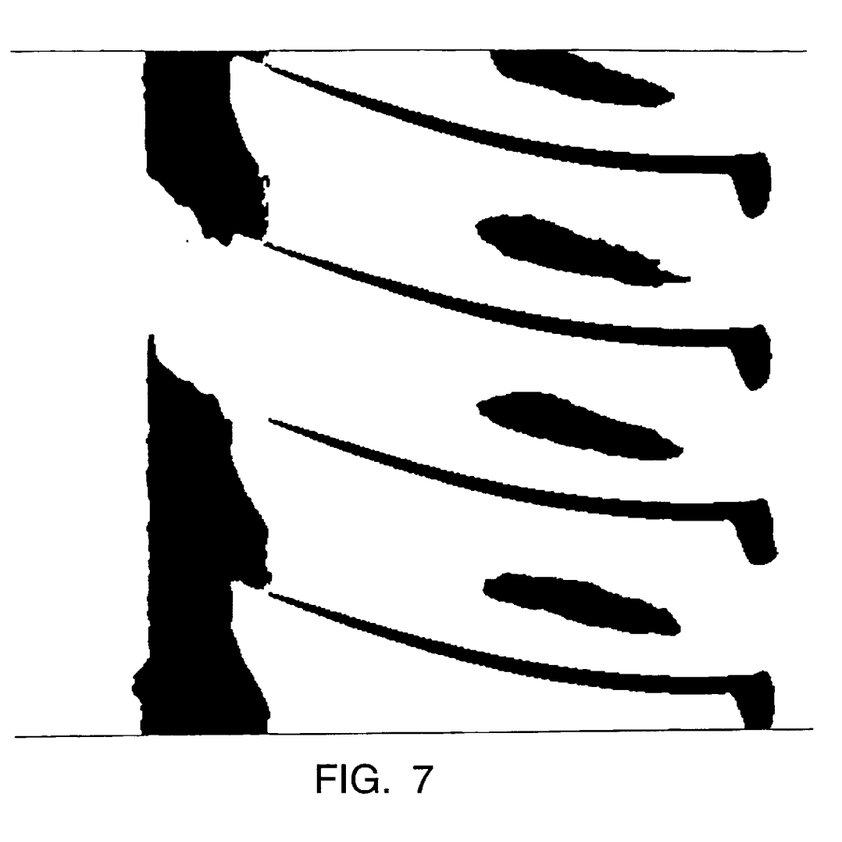
FIG. 7 represents an image matrix of the tooth flanks which contains the contact patterns as solid black areas and which is obtained by binary representation of the image according to FIG. 2.

2.4 Extracting the Contact Pattern (FIGS. 6 and 7)

In this preprocessing step the contact patterns 28 are extracted from the first digital gray level image. The contact patterns 28 are represented in the image matrix by pixels with a low gray value. The histogram 54 of the first digital gray level image 50 is evaluated (FIG. 6) to determine the range of gray values that can be assigned to the contact patterns. The histogram according to FIG. 6 shows the frequency of occurrence of the individual gray values in an image matrix. Upon automatic determination of a suitable threshold value X (e.g. 15% of the lowest gray values), a binary representation (block 58 in FIG. 11) of the first digital gray level image is made on the basis of this threshold value. All pixels having a gray value less than the threshold value are assigned the gray value 0. The gray value 255 is assigned to all other pixels. A third digital image in the form of an image matrix containing the contact patterns as solid black areas (FIG. 7) in the region of the tooth flanks is now available in the image memory 54 as the result.

2.5 Compounding the $2^{nd}$ and $3^{rd}$ Digital Images (FIG. 8)

The flank regions represented in the second digital image (FIG. 5) by pixels having the gray value 255 and lying within the closed flank boundary contour are identified in the third digital image (FIG. 7). The gray values of these pixels in the third digital image are now inscribed into the respective positions in the image matrix of the second digital image (block 68 in FIG. 11). Subsequently the entire image matrix is inverted (block 70 in FIG. 11) to enable easier evaluation. Closed flank boundaries or outlines with the inscribed contact patterns (FIG. 8) are now available as the result.

2.6 Equalizing the Image (FIG. 9)

The image matrix can be additionally equalized. This corresponds to a development in a plane and is depicted in FIG. 9.

This concludes the preprocessing of the image. The present image matrix according to FIGS. 8 or 9 can now be analyzed for the purpose aimed at here, namely the measurement of the position of the contact patterns relative to the outline or the flank boundaries.

3. Evaluating the Image (FIG. 10)

Figure 10A:
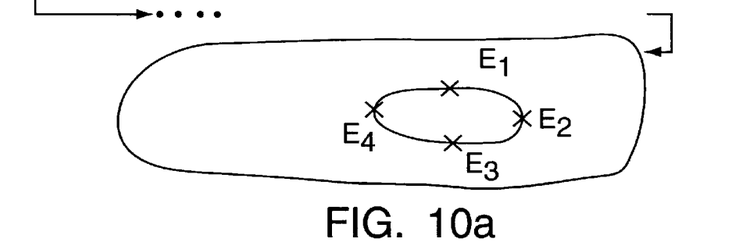

The image is analyzed in the following steps:

3.1 Line-by-line searching for four extreme points of each contact pattern with reference to the outline of the tooth flank (FIG. 10*a*). The direction of this search in FIG. 10*a* is from right to left, as indicated by arrows.

Figure 10B:
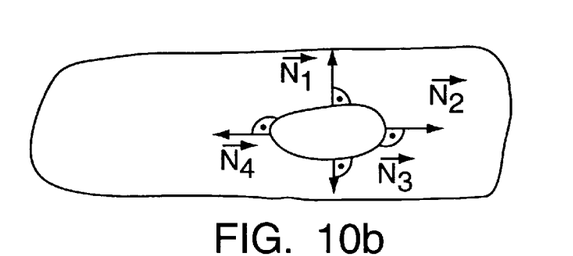

3.2 Determining the normals in each of the four extreme points (FIG. 10*b*).

Figure 10C:
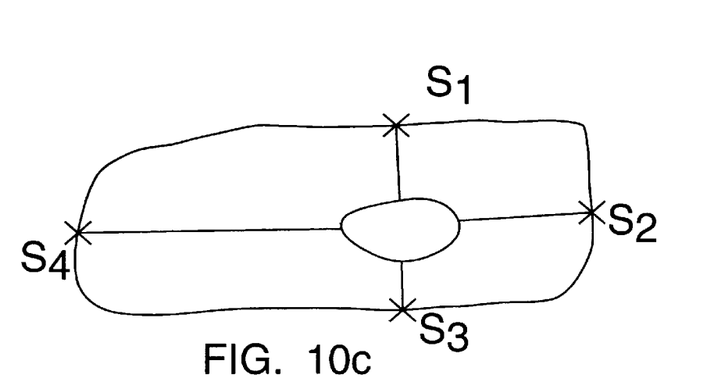

3.3 Determining the points of intersection with the outline, of a straight line lain in the normal (FIG. 10*c*).

Figure 10D:
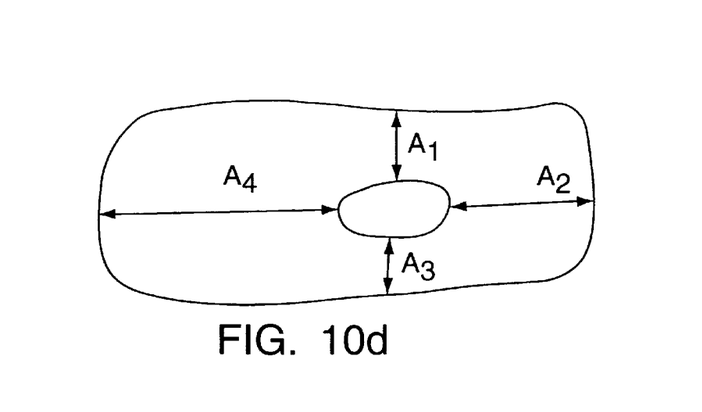

3.4 Determining the distance of each point of intersection from the associated extreme point (FIG. 10*d*).

3.5 Establishing further geometric characteristics of the contact pattern (not shown), if needed.

What is claimed is:

1. A method of optoelectronically determining the contact patterns on tooth flanks of gears, the tooth flanks of at least one gear of a pair of gears to be tested being marked by application of a marking compound, characterized by the following steps:

(a) picking-up and storing a first digital image (FIG. 2) of at least one drive and/or coast side tooth flank of the marked gear containing a outline, said tooth flank having a contact pattern;

(b) processing said first digital image to determine a second digital image (FIG. 5) containing at least a portion of the outline of said tooth flank;

(c) processing said first digital image to determine a third digital image (FIG. 7) containing said contact pattern; and (d) superimposing said third digital image (FIG. 7) on said second digital image (FIG. 5) of said tooth flank to determine a fourth digital image (FIG. 8) of said tooth flank, said fourth digital image containing at least the tooth flank outline portion determined in step (b) and having its contact pattern inscribed therein, and being analyzable to determine the position and size of the contact pattern with reference to the outline.

2. The method according to claim 1, characterized in that in step (a) the tooth flanks of the marked gear are picked-up with at least one line-scan camera and are stored line by line in an image matrix as a first digital gray level image (FIG. 2) containing a plurality of pixels, each having a gray value.

3. The method according to claim 2, characterized in that gray values between 0 and 255 are assigned to the pixels.

4. The method according to claim 2 or 3, characterized in that the first digital gray level image is high-pass filtered to more heavily emphasize the contours of the tooth flanks (FIG. 3).

5. The method according to claim 4, characterized in that a first or a second binary value is assigned to each pixel by comparison of its gray value with a first threshold value (FIG. 4).

6. The method according to claim 5, characterized in that a value above 200 is selected as said first threshold value.

7. The method according to claim 5 or 6, characterized in that the portion of the outline of each tooth flank determined in step (b) is closed or is supplemented such that said second digital image contains at least two complete, adjacent sides or four points of the outline or the complete, closed outline (FIG. 5).

8. The method according to claim 7, characterized in that in step (c) the contact patterns are extracted from said first digital gray level image (FIG. 2) in that a histogram of said first gray level image is evaluated with a second threshold value such that said third digital image (FIG. 7) contains the contact patterns as solid areas in the region of the tooth flank.

9. The method according to claim 8, characterized in that a value amounting to 15% to 20% of the lowest gray value is selected as said second threshold value.

10. The method according to any of claims 5 to 9, characterized in that the flank regions represented in said second digital image (FIG. 5) by contact pattern points having the second binary value and lying in a surface defined by said outline portion determined in step (b), are identified in said third digital image (FIG. 7) and are inscribed into the image matrix of said second digital image (FIG. 5).

11. The method according to claim 10, characterized in that, to facilitate the analysis, the image matrix of said second digital image (FIG. 5) is inverted to form said fourth digital image (FIG. 8) after said inscription of the contact image points.

12. The method according to claim 10 or 11, characterized in that to determine the position and size of the contact pattern, its position with reference to the outline of the tooth flank is measured.

13. The method according to claim 12, characterized by (α) line-by-line searching for extreme points of every contact pattern with reference to the outline of the tooth flank (FIG. 10a);

(β) determining the normal in each extreme point (FIG. 10b);

(χ) determining the points of intersection with the outline, of a straight line lying in the normal (FIG. 10c); and (δ) determining the distance of each point of intersection from the associated extreme point (FIG. 10d).

14. The method according to any of claims 2 to 13, characterized in that each pixel of said fourth digital image (FIG. 8) is converted to an equalized representation by a mathematical transformation taking the shape and curvature of each tooth flank into account, said equalized representation corresponding to a depiction of the tooth flank developed in a plane.

15. The method according to any of claims 1 to 14, characterized in that the respective digital images are each generated by superimposing and averaging the picked-up image of a plurality of tooth flanks.

16. An apparatus for optoelectronically determining the contact patterns on tooth flanks of gears, having a device (26) for applying a marking compound to the tooth flanks of at least one gear (22, 24) of the pair of gears to be tested, characterized by at least one camera (30, 32) for picking-up a first digital image (50) containing a plurality of pixels, of at least one drive and/or coast side tooth flank of said marked gear containing a outline (24), said tooth flank having a contact pattern (28);

an image memory (40) for storing the pixels in an image matrix (FIG. 2);

first means (52) for processing said image matrix to generate a second digital image in which at least one portion of the outline of the tooth flank is more heavily emphasized (FIG. 3);

second means (54) for processing said first digital image, to generate a third digital image (FIG. 7) containing said contact pattern; and means (68) for superimposing said third digital image onto said second digital image of said tooth flank to define a fourth digital image (FIG. 8) of said tooth flank, said fourth digital image containing at least the determined portion of the outline, with the respective contact pattern inscribed therein.

17. The apparatus according to claim 16, characterized by assignment means (34) connected to said image memory (40) for assigning a predeterminded gray value to each pixel of said first digital image (50), so that said first digital image is stored as a digital gray level image in said image memory (40).

18. The apparatus according to claim 17, characterized in that said assignment means (34) are selected and adjustable such that the gray values assigned to the pixels lie between 0 and 255.

19. The apparatus according to any of claims 16 to 18, characterized in that said camera (32) is a line-scan camera.

20. The apparatus according to any of claims 16 to 18, characterized in that said first processing means comprise a high-pass filter (52).

21. The apparatus according to any of claims 16 to 20, characterized in that said first processing means (52) comprise means (56) for determining a first threshold value for all pixels, such that a first binary value is assigned to all pixels with a gray value below said first threshold value, and such that a second binary value is assigned to all pixels with a gray value above said first threshold value.

22. The apparatus according to any of claims 16 to 21, characterized by a contour tracer (60) with search beam to search for and interconnect discontinuous regions of the determined outline portion (FIG. 5).

23. The apparatus according to any of claims 15 to 22, characterized by means for creating and evaluating a histogram (62) of said first digital gray level image (50) to determine a second threshold value (64) for generating said third digital image (FIG. 7).

24. The apparatus according to any of claims 16 to 23, characterized by means (74) for evaluating said fourth digital image (FIG. 8) to measure the position and size of the contact pattern with reference to the outline (FIG. 8).

25. The apparatus according to any of claims 16 to 24, characterized by means (72) for the mathematical transformation of said fourth digital image (FIG. 8) to an equalized representation corresponding to a development of the tooth flank in a plane (FIG. 9).

* * * * *